(No Model.)

D. S. GALLATIN.
TWO WHEELED VEHICLE.

No. 493,764. Patented Mar. 21, 1893.

Witnesses
E. G. Lane
Chas. R. Miller

Inventor
Daniel S. Gallatin
By W. K. Miller
Attorney

UNITED STATES PATENT OFFICE.

DANIEL S. GALLATIN, OF NEW BERLIN, OHIO.

TWO-WHEELED VEHICLE.

SPECIFICATION forming part of Letters Patent No. 493,764, dated March 21, 1893.

Application filed September 19, 1892. Serial No. 446,306. (No model.)

*To all whom it may concern:*

Be it known that I, DANIEL S. GALLATIN, a citizen of the United States, and a resident of New Berlin, county of Stark, State of Ohio, have invented a new and useful Improvement in Two-Wheeled Vehicles, of which the following is a full, clear, and exact description, reference being had to the accompanying drawings, making part of this specification.

My invention relates to improvements in two wheeled vehicles commonly called sulkies, and consists of certain features of construction and combination of parts as will be hereinafter described and pointed out in the claims.

Figure 1:
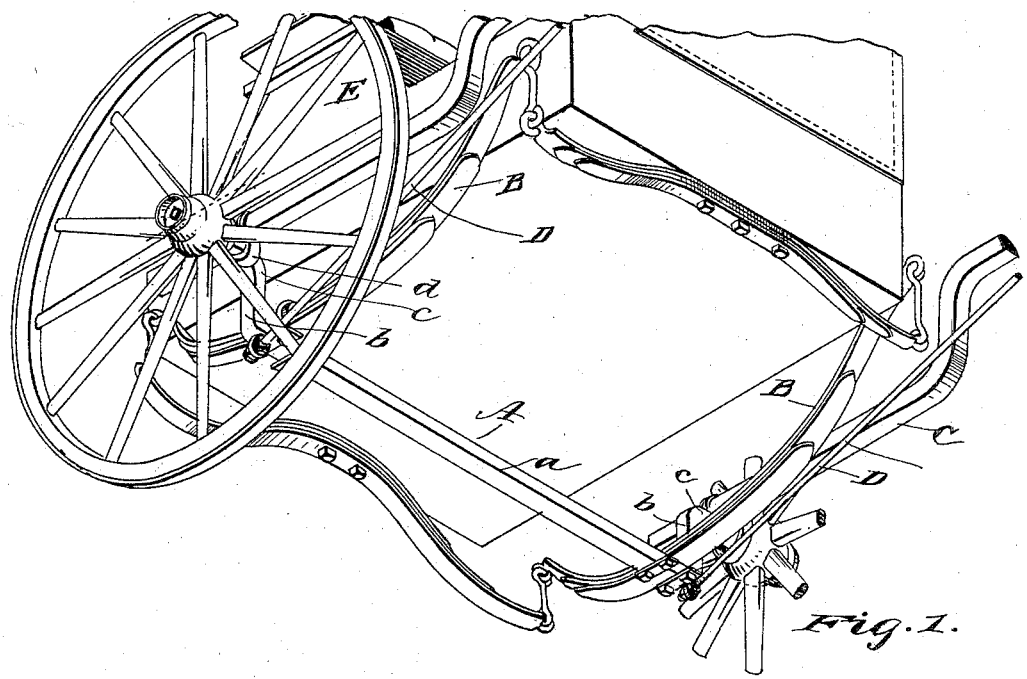
Figure 2:
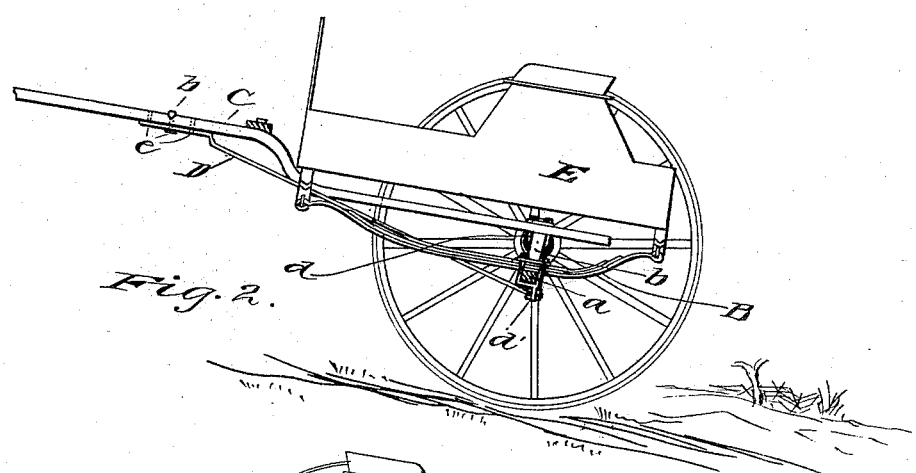
Figure 3:
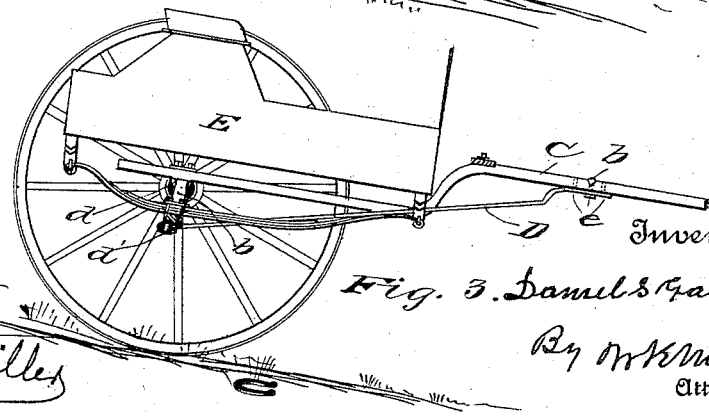

Figure 1 is a view in perspective of a two wheeled vehicle illustrating my invention, from below. Fig. 2 a side view partly sectional from inside of right hand side spring. Fig. 3, a similar view from inside of left hand wheel.

The prime object sought by this invention is to provide means by which the weight of the person on the seat will serve automatically to balance the load, and relieve the animal from the downward thrust of the shafts when on a descending, and from an upward pull or lift when on an ascending grade, and for adjusting the vehicle to the height of the animal.

A represents the axle which is of the crank form as shown in the drawings. The side springs B are secured to the lower or cross part $a$ of the axle inside the parallel portion $b$. The shaft C is loosely connected to the upper portion $c$ of the axle by a clasp $d$, that will allow the axle to rotate therein. To secure the axle in a desired adjustment with the shafts to relieve the body from "horse movement," and to adjust the shafts C to the height of the horse, a cord or brace D is provided having at its rear end a loose or pivotal connection $d'$ with the lower portion of the axle and at its front end a series of apertures $e$ by which the brace or cord may be secured to the bolt $b$ in the shaft. In addition to the adjustment of the height of the front ends of the shafts, the brace D serves to adjust the lower part of the axle back of or in front of, a line drawn vertically through the spindle. When adjusted back of the vertical line as shown, in Fig. 3, the weight of the driver on the seat, directly over the lower or crank portion of the axle, and behind the spindle, which serves as a pivot, will tend to force the lower portion of the axle to a point vertically below the spindle, and through the brace D, to raise the front part of the shafts, and thereby reduce the burden on the back of the horse. This is of special advantage in descending steep or abrupt grades, the horse below the tread of the wheels will turn the cranked portion of the axle back of the spindle or back of a line drawn vertically through the spindle, in which case the weight of the body E, with the occupants will tend to force the cranked portion of the axle to a point vertically below the spindles and as before stated through the braces push or lift up under the shafts and relieve the horse of great burden. The reverse of this is true in going up steep grades, the horse above the wheels will swing the lower portion of the axle in front of the spindles, and in this case, the weight of the body E and the occupant will be exerted to prevent a backward tipping and an up lifting on the harness and horse, and tend to hold the harness down upon the horse.

The side springs B are of the half elliptic form and are secured to the axle at a point in rear of the center of the spring, at the ends of the spring B, cross springs F are loosely secured, the central portions of which are secured to the body as shown in Fig. 1, thus forming a platform spring with the more yielding or supple portion in the front of the axle, and the more rigid portion at the rear of the axle, by which arrangement that part of the spring required to sustain the greater part of the load is the most rigid and able to support the load, leaving the front or that part of the spring more flexible to support the lighter portion of the load. This arrangement of spring also serves to relieve the person occupying the seat from the back and forth movement caused by the movement of the horse.

Having thus fully described the nature and object of my invention, what I claim, and desire to secure by Letters Patent, is—

1. The combination in a sulky of a crank axle, side springs rigidly secured thereto, a seat over said axle, end springs secured thereto, flexible connections between the end springs and the side springs, shafts loosely connected with said axle, and an adjustable brace rod for adjusting the inclination of said shafts, for the purpose set forth.

2. The combination in a sulky of the crank axle, side springs secured thereto, a seat over said axle, end springs secured thereto, shafts loosely connected with the axle, and an adjustable brace or cord connecting the axle with the shafts, substantially as described and for the purpose set forth.

In testimony whereof I have hereunto set my hand this 10th day of September, A. D. 1892.

DANIEL S. GALLATIN.

Witnesses:
W. K. MILLER,
CHAS. R. MILLER.